(12) United States Patent
Gupta et al.

(10) Patent No.: US 11,586,442 B2
(45) Date of Patent: Feb. 21, 2023

(54) SYSTEM AND METHOD FOR CONVOLVING IMAGE WITH SPARSE KERNELS

(71) Applicant: NXP USA, Inc., Austin, TX (US)

(72) Inventors: Atul Gupta, Noida (IN); Amit Goel, Noida (IN)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 16/987,371

(22) Filed: Aug. 6, 2020

(65) Prior Publication Data

US 2022/0043657 A1 Feb. 10, 2022

(51) Int. Cl.
*G06F 9/38* (2018.01)
*G06N 3/08* (2006.01)
*G06F 9/30* (2018.01)
*G06F 9/54* (2006.01)

(52) U.S. Cl.
CPC .......... *G06F 9/3836* (2013.01); *G06F 9/3001* (2013.01); *G06F 9/30032* (2013.01); *G06F 9/30043* (2013.01); *G06F 9/545* (2013.01); *G06N 3/08* (2013.01)

(58) Field of Classification Search
CPC .................................................... G06F 9/3836
See application file for complete search history.

(56) References Cited

U.S. PATENT DOCUMENTS

| | | |
|---|---|---|
| 7,085,795 B2 | 8/2006 | Debes et al. |
| 9,697,463 B2 | 7/2017 | Ross et al. |
| 2016/0335082 A1 | 11/2016 | Sadeh et al. |
| 2017/0024218 A1 | 1/2017 | Mahurin et al. |
| 2018/0005074 A1 | 1/2018 | Shacham et al. |
| 2018/0046898 A1* | 2/2018 | Lo .......... H04N 19/42 |
| 2018/0129893 A1* | 5/2018 | Son ......... G06V 10/95 |
| 2018/0181857 A1 | 6/2018 | Mathew et al. |
| 2018/0285682 A1* | 10/2018 | Najibi .......... G06K 9/6289 |
| 2020/0202198 A1* | 6/2020 | Lee .......... G06N 3/063 |

(Continued)

OTHER PUBLICATIONS

Vanhoucke, V. et al. "Improving the speed of neural networks on CPUs", Google, retrieved from the internet Aug. 5, 2020 at: https://static.googleusercontent.com/media/research.google.com/en//pubs/archive/37631.pdf, 8 pgs. (2011).

(Continued)

*Primary Examiner* — Michael J Metzger

(57) ABSTRACT

An image processing system for convolving an image includes processing circuitry that is configured to retrieve the image including a set of rows, a merged kernel, multiple skip values and a pixel base address. The merged kernel includes all non-zero coefficients of a set of kernels. Each skip value corresponds to a location offset of each non-zero coefficient with respect to a previous non-zero coefficient. Further, the processing circuitry is configured to execute a multiply-accumulate (MAC) instruction and a load instruction parallelly in one clock cycle for multiple times, on the set of rows and the merged kernel to convolve the image with the merged kernel. Each row on which the MAC and load instructions are executed is associated with a corresponding non-zero coefficient and a corresponding skip value. The load instruction is executed based on the pixel base address, the corresponding skip value, and a width of each row.

19 Claims, 10 Drawing Sheets

(56) References Cited

U.S. PATENT DOCUMENTS

2020/0326938 A1* 10/2020 Liu .................. G06F 9/3887
2021/0233202 A1 7/2021 Goel et al.

OTHER PUBLICATIONS

"Coding for Neon—Part 3: Matrix Multiplication", Arm Community, retrieved from the internet Aug. 5, 2020 at: https://community.arm.com/developer/ip-products/processors/b/processors-ip-blog/posts/coding-for-neon---part-3-matrix-multiplication, 11 pgs. (Sep. 11, 2013).

Liu, B. et al. "Sparse Convolutional Neural Networks", Computer Vision Foundation, University of Central Florida, retrieved from the internet Aug. 5, 2020 at: https://www.cv-foundation.org/openaccess/content_cvpr_2015/papers/Liu_Sparse_Convolutional_Neural_2015_CVPR_paper.pdf, 9 pgs. (2015).

Dettmers, T. et al. "Deep Learning in a Nutshell: Core Concepts", Artificial Intelligence, retreived from the internet Aug. 5, 2020 at: https://developer.nvidia.com/blog/deep-learning-nutshell-core-concepts/, 11 pgs. (Nov. 3, 2015).

Srinivas, S. et al. "Training Sparse Neural Networks", Cornell University, retrieved from the internet Aug. 5, 2020 at: https://arxiv.org/pdf/1611.06694.pdf, 7 pgs., (Nov. 21, 2016).

Rodriguez, A. et al. "Lower Numerical Precision Deep Learning Inference and Training—White Paper", Intel, retreived from the internet Aug. 5, 2020 at: https://www.intel.com/content/dam/www/public/us/en/ai/documents/Lower-Numerical-Precision-Deep-Learning-Inference-Training.pdf, 19 pgs. (Jan. 2018).

Reetuparna, D. et al. "DNN Accelerator Architecture—SIMD or Systolic?", ACM SIGARCH, retrieved from the internet Aug. 5, 2020 at: https://www.sigarch.org/dnn-accelerator-architecture-simd-or-systolic/, 9 pgs. (Sep. 17, 2018).

Kung, H. T. et al. "Packing Sparse Convolutional Neural Networks for Efficient Systolic Array Implementations: Column Combining Under Joint Optimization", Harvard University, retrieved from the internet Aug. 5, 2020 at: http://www.eecs.harvard.edu/~htk/publication/2019-asplos-kung-mcdanel-zhang.pdf 14 pgs. (2019).

Singh, R. "Pruning Deep Neural Network", retrieved from the internet Aug. 5, 2020 at: https://towardsdatascience.com/pruning-deep-neural-network-56cae1ec5505, 9 pgs. (Jul. 30, 2019).

"Advanced Vector Extensions", Wikipedia, 8 pgs. Retreived from the internet Aug. 5, 2020 at: https://en.wikipedia.org/wiki/Advanced_Vector_Extensions.

* cited by examiner

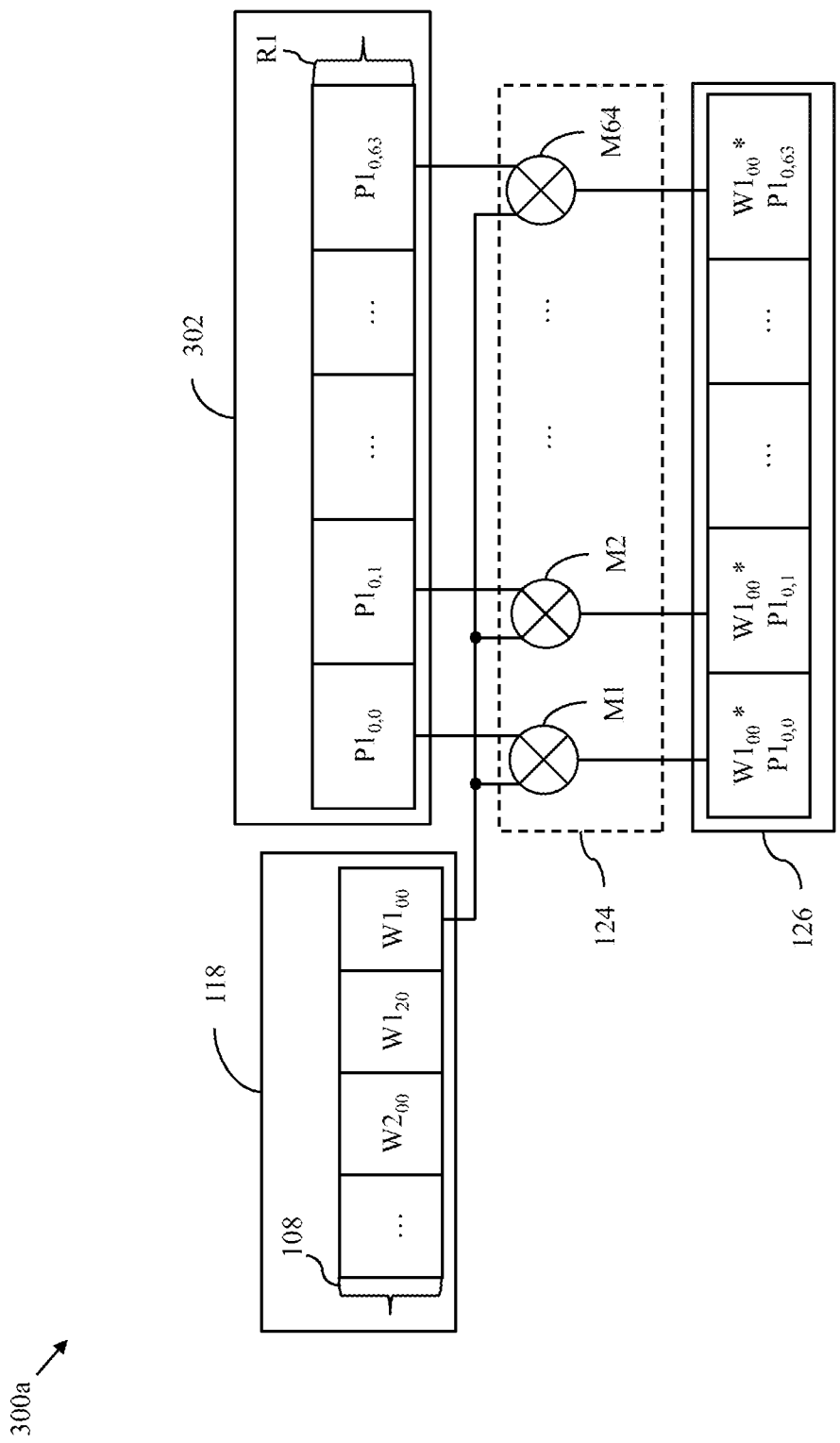

| | | |
|---|---|---|
| First Clock Cycle | - | Load Merged Kernel in Weight Register |
| Second Clock Cycle | - | Load Plurality of Skip Values in Skip Register |
| Third Clock Cycle | - | Load First Row of Image associated with First Non-Zero Coefficient in First Vector Register |
| Fourth Clock Cycle | Execute MAC instruction on First Row and Merged Kernel | Load Third Row of Image associated with Second Non-Zero Coefficient in Second Vector Register |
| Fifth Clock Cycle | Execute MAC instruction on Third Row and Merged Kernel | Load Next Row of Image associated with Subsequent Non-Zero Coefficient in Subsequent Vector Register |

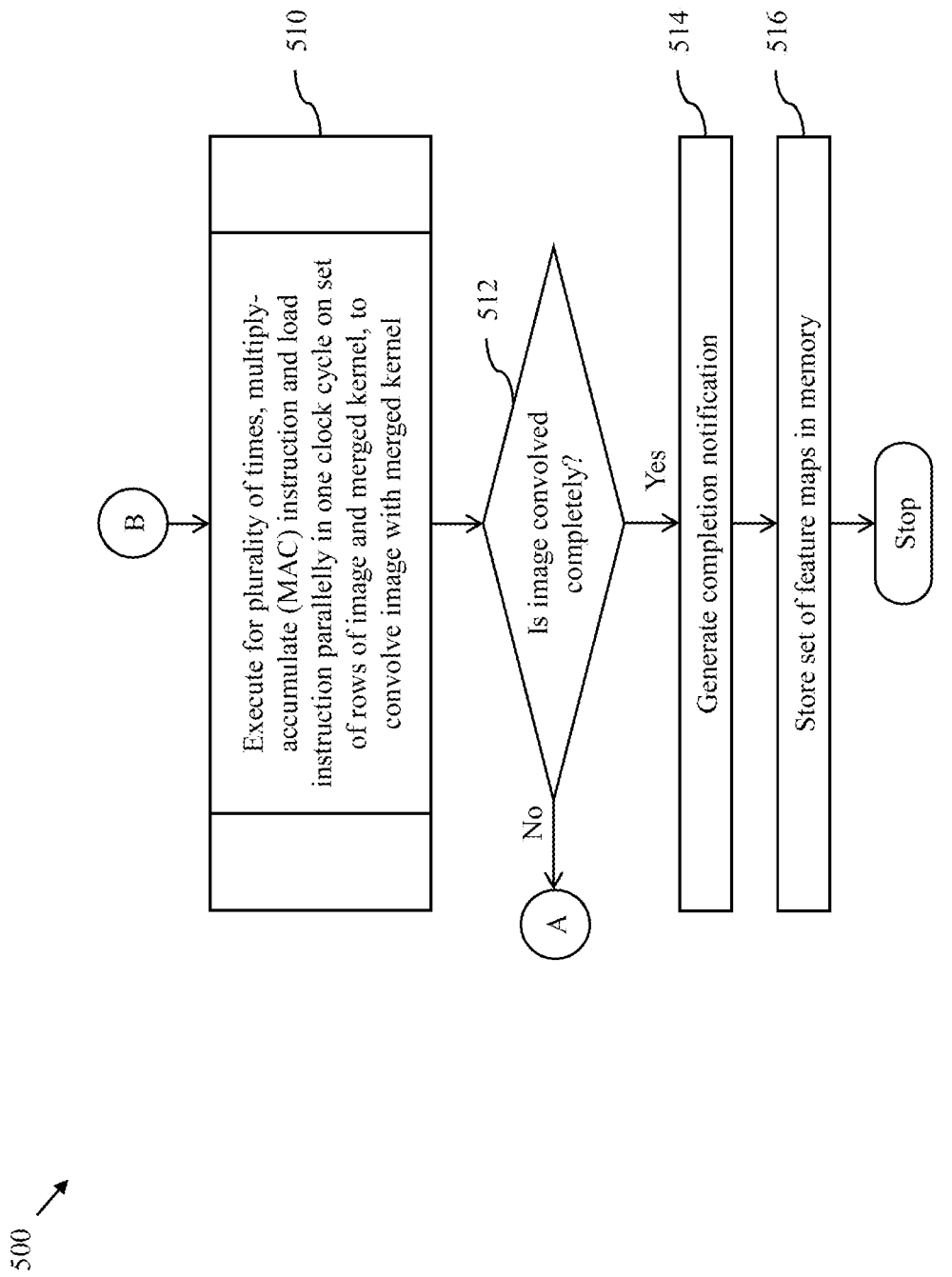

SYSTEM AND METHOD FOR CONVOLVING IMAGE WITH SPARSE KERNELS

CROSS-REFERENCE TO RELATED APPLICATIONS

The present application is related to U.S. patent application Ser. No. 16/775,225, filed on Jan. 28, 2020 and entitled "SYSTEM AND METHOD FOR CONVOLVING AN IMAGE", the contents of which are incorporated herein by reference.

BACKGROUND

The present disclosure relates generally to image processing systems, and, more particularly, to a system and a method for convolving an image with sparse kernels.

Convolution techniques are utilized for performing various image processing functions (such as object detection and classification) on images based on extracted features of the images. Conventionally, to convolve an image, an image processing system executes vector and scalar load operations to load rows of the image in vector registers and weight coefficients of kernels in a scalar register, respectively, and further executes multiplication and accumulation operations on the loaded rows and the weight coefficients. The image processing system, however, is unable to execute the vector and scalar load operations in a single clock cycle. Hence, the image processing system is unable to execute the multiplication and accumulation operations in each clock cycle.

The kernels in a convolution neural network are typically sparse kernels, i.e., a value of a majority of weight coefficients in the kernels is zero. Multiplication of such a weight coefficient with the corresponding row of the image results in an output with all values equal to zero. Thus, the multiplication and accumulation operations that involve a weight coefficient having a value zero do not contribute to convolution output, and result in the wastage of a clock cycle, thereby hampering a utilization of the image processing system. Further, the multiplication and accumulation operations that involve the weight coefficient having a value zero consume a significant amount of power. As a result, a power consumption of the image processing system is significant. In addition, to execute various image processing functions on the image by way of multiple kernels, each row is loaded several times, thereby requiring a significant memory bandwidth of the image processing system. Therefore, there exists a need for a system and a method that solves the aforementioned problems of the existing techniques of convolving the image with sparse kernels.

SUMMARY

In one embodiment, an image processing system for convolving an image is disclosed. The image processing system comprises processing circuitry that is configured to retrieve the image, a merged kernel, a plurality of skip values, and a pixel base address. The merged kernel includes a plurality of non-zero coefficients of a set of kernels. Each skip value corresponds to a location offset of each non-zero coefficient with respect to a previous non-zero coefficient of the plurality of non-zero coefficients. The processing circuitry is further configured to execute, for a plurality of times, a multiply-accumulate (MAC) instruction and a load instruction parallelly in one clock cycle on a set of rows of the image and the merged kernel to convolve the image with the merged kernel. The MAC and load instructions are executed parallelly in one clock cycle on first and second rows of the set of rows, respectively, such that the first and second rows are associated with first and second non-zero coefficients of the plurality of non-zero coefficients and first and second skip values of the plurality of skip values, respectively. The load instruction on the second row is executed based on the pixel base address, the second skip value, and a width of each row of the set of rows.

In another embodiment, a method for convolving an image is disclosed. The method includes retrieving, by processing circuitry from a memory, the image, a merged kernel, a plurality of skip values, and a pixel base address. The merged kernel includes a plurality of non-zero coefficients of a set of kernels. Each skip value corresponds to a location offset of each non-zero coefficient with respect to a previous non-zero coefficient of the plurality of non-zero coefficients. The method further includes executing, for a plurality of times by the processing circuitry, a MAC instruction and a load instruction parallelly in one clock cycle on a set of rows of the image and the merged kernel to convolve the image with the merged kernel. The MAC and load instructions are executed parallelly in one clock cycle on first and second rows of the set of rows, respectively, such that the first and second rows are associated with first and second non-zero coefficients of the plurality of non-zero coefficients and first and second skip values of the plurality of skip values, respectively. The load instruction is executed based on the pixel base address, the second skip value, and a width of each row of the set of rows.

In some examples, the image processing system further comprises a memory that is coupled with the processing circuitry, and configured to store the image, the merged kernel, the plurality of skip values, and the pixel base address. The processing circuitry retrieves the image, the merged kernel, the plurality of skip values, and the pixel base address from the memory.

In some examples, the convolution of the image with the merged kernel corresponds to generation of a set of feature maps, and wherein the processing circuitry is further configured to store the set of feature maps in the memory.

In some examples, the processing circuitry comprises a vector register set, a weight register and a skip register. The vector register set comprising first and second vector registers that are configured to store the first and second rows, respectively. The weight register is configured to store the merged kernel. The plurality of non-zero coefficients of the set of kernels are arranged column-wise serially in the merged kernel. The skip register is configured to store the plurality of skip values. The location offset corresponding to each skip value includes a row offset and a column offset.

In some examples, the processing circuitry further comprises a load-store circuit that is coupled with the vector register set, the weight register, and the skip register, and configured to load the merged kernel in the weight register to store the merged kernel therein and load the plurality of skip values in the skip register to store the plurality of skip values therein. The load-store circuit is further configured to load, by executing the load instruction on the first row, the first row in the first vector register to store the first row therein. The load-store circuit loads the first row in the first vector register based on the pixel base address, the first skip value, and the width of each row.

In some examples, the load-store circuit is further configured to load, by executing the load instruction on the second row, the second row in the second vector register to store the second row therein. After the first row is loaded in the first vector register in one clock cycle, the second row is loaded in the second vector register in a subsequent clock cycle.

In some examples, to execute the MAC instruction, the processing circuitry is further configured to execute multiplication and accumulation operations on the first row and the first non-zero coefficient, and a logical shift operation on the merged kernel.

In some examples, the processing circuitry further comprises a convolution circuit that is coupled with the vector register set and the weight register, and configured to receive the first and second rows and the merged kernel from the vector register set and the weight register, respectively, to execute the MAC instruction thereon.

In some examples, the convolution circuit comprises a plurality of multipliers and an accumulation register. The plurality of multipliers are coupled with the vector register set and the weight register, and configured to execute the multiplication operation to multiply each element associated with each row with a corresponding non-zero coefficient of the merged kernel and generate pluralities of multiplication outputs. The accumulation register is coupled with the plurality of multipliers, and configured to receive the pluralities of multiplication outputs and execute the accumulation operation to accumulate the pluralities of multiplication outputs therein.

In some examples, the convolution circuit further comprises a first shifter circuit that is coupled with the weight register, and configured to execute the logical shift operation on the merged kernel to shift a current non-zero coefficient of the merged kernel by replacing the current non-zero coefficient with a subsequent non-zero coefficient of the merged kernel, when a first plurality of elements associated with the currently loaded row in the vector register are multiplied with the current non-zero coefficient.

In some examples, wherein the convolution circuit further comprises a second shifter circuit that is coupled with the skip register, and configured to execute the logical shift operation on the plurality of skip values to shift a current skip value of the plurality of skip values by replacing the current skip value with a subsequent skip value of the plurality of skip values.

In some examples, when a width of the image is at most half of a width of each vector register of the vector register set, each vector register of the vector register set is configured to store at least two rows.

In some examples, the MAC instruction and the load instruction include first and second pluralities of instructions in a very long instruction word (VLIW) architecture. Each instruction of the first and second pluralities of instructions corresponds to a single instruction multiple data (SIMD) instruction.

In some examples, the processing circuitry is further configured to generate a completion notification when the image is convolved with the merged kernel completely.

Various embodiments of the present disclosure disclose an image processing system. The image processing system includes processing circuitry that is configured to retrieve the image, a merged kernel, a plurality of skip values, and a pixel base address. The merged kernel includes all non-zero coefficients of a set of kernels. Each skip value corresponds to a location offset of each non-zero coefficient with respect to a previous non-zero coefficient. Further, a MAC instruction and a load instruction are executed parallelly in one clock cycle for a plurality of times, on a set of rows of the image and the merged kernel to convolve the image with the merged kernel. Each row on which the MAC and load instructions are executed is associated with a non-zero coefficient and a skip value. The load instruction on a row of the set of rows is executed based on the pixel base address, a corresponding skip value, and a width of each row of the set of rows.

The processing circuitry exclusively loads the set of rows that are associated with a non-zero coefficient of the plurality of non-zero coefficients based on the pixel base address, a corresponding skip value, and the width of each row. As a result, a need to load remaining rows of the image that are associated with coefficients of the set of kernels having a value zero is eliminated. Hence, a memory bandwidth requirement of the image processing system is less as compared to conventional image processing systems. As the MAC and load instructions are executed in the same clock cycle, the image processing system of the present disclosure is capable of executing the MAC instruction in each clock cycle. Further, as the image processing system skips loading rows that are associated with coefficients of the set of kernels that have value zero, the execution of the MAC instruction on the rows and the coefficients having value zero is eliminated. Thus, a number of clock cycles consumed by the image processing system is less as compared to the conventional image processing systems. As a result, a power consumption of the image processing system reduces and a utilization of the image processing system is improved as compared to the conventional image processing systems.

BRIEF DESCRIPTION OF THE DRAWINGS

The following detailed description of the preferred embodiments of the present disclosure will be better understood when read in conjunction with the appended drawings. The present disclosure is illustrated by way of example, and not limited by the accompanying figures, in which like references indicate similar elements.

FIGS. 3A and 3B are block diagrams that, collectively, illustrate convolution of first and third rows of the set of rows of FIG. 2 with the merged kernel of FIG. 1 in accordance with an embodiment of the present disclosure;

FIG. 4 is a table illustrating operations performed at each clock cycle by a load-store circuit and a convolution circuit of the image processing system of FIG. 1 in accordance with an embodiment of the present disclosure;

FIGS. 5A-5D, collectively, represent a flow chart that illustrates a method for convolving the image by a processing circuitry of the image processing system of FIG. 1 in accordance with an embodiment of the present disclosure.

DETAILED DESCRIPTION

The detailed description of the appended drawings is intended as a description of the currently preferred embodiments of the present disclosure, and is not intended to represent the only form in which the present disclosure may be practiced. It is to be understood that the same or equivalent functions may be accomplished by different embodiments that are intended to be encompassed within the spirit and scope of the present disclosure.

Figure 1:
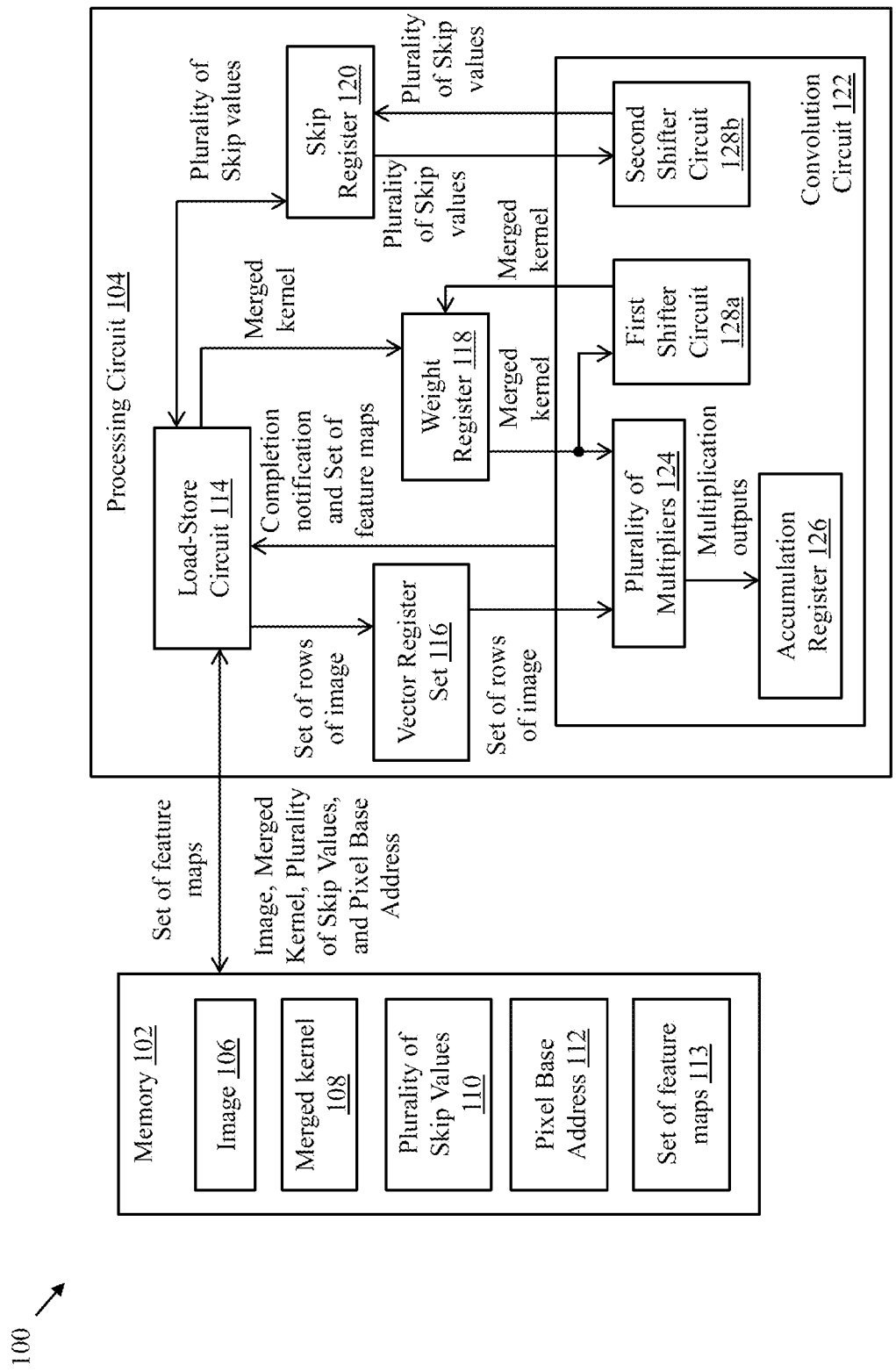
FIG. 1 is a schematic block diagram of an image processing system for convolving a set of images in accordance with an embodiment of the present disclosure.

FIG. 1 is a schematic block diagram of an image processing system 100 for convolving a set of images in accordance with an embodiment of the present disclosure. The image processing system 100 may be utilized to implement a convolutional neural network that includes multiple convolution layers to perform various image processing functions such as object detection, edge detection, and the like. The image processing system 100 includes a memory 102 and processing circuitry 104.

The set of images includes an image 106 that may be captured by an image sensor (not shown). In one embodiment, the image sensor is internal to the image processing system 100. In another embodiment, the image sensor is external to the image processing system 100. The image sensor may be configured to output the captured image 106 in a specific format, and provide the outputted image 106 to a pre-processing circuit (not shown). In one example, the image sensor outputs the image 106 in a bayer pattern image format.

The pre-processing circuit may be configured to convert the image 106 from the bayer pattern image format to a YUV image format, and provide the image 106 in the YUV image format to the memory 102. The image 106 is a matrix of elements that may have dimensions including, but not limited to, 1080×1080, 1080×720, 1024×768, and 1920×1080. Although in the current embodiment, the image 106 is captured by the image sensor, it will be apparent to a person skilled in the art that the scope of the present disclosure is not limited to it. In various other embodiments, the image 106 may represent an output (i.e., an output feature map) of a previous convolution layer of the convolutional neural network, without deviating from the scope of the present disclosure. It will further be apparent to a person skilled in the art that the image 106 may correspond to a complete image frame or a portion of the image frame, without deviating from the scope of the present disclosure.

The memory 102 is configured to receive the image 106 from the pre-processing circuit and store the received image 106. The memory 102 is further configured to store a merged kernel 108. In one embodiment, an analysis engine (not shown) of the image processing system 100 is configured to generate the merged kernel 108 based on a set of kernels (shown later in FIG. 2). The set of kernels are utilized to extract various features (e.g., edges, objects, and the like) from the image 106 for executing various image processing functions (e.g., edge detection, object detection, and the like).

Each kernel of the set of kernels is a matrix of coefficients (i.e., weight coefficients) that indicates a feature to be extracted from the image 106. In one example, a first kernel (shown later in FIG. 2) of the set of kernels indicates that edges are the feature to be extracted from the image 106, whereas a second kernel (shown later in FIG. 2) of the set of kernels indicates that objects are the feature to be extracted from the image 106. Further, each kernel is a sparse kernel that has a significant number of coefficients having value zero, and remaining coefficients having value greater than zero. In one embodiment, a pruning technique is implemented on each kernel such that coefficients having values near to zero are replaced with zeros to obtain sparse kernels with significant number of coefficients having value zero. The merged kernel 108 includes a plurality of non-zero coefficients (i.e., all coefficients having value greater than zero) of the set of kernels. The plurality of non-zero coefficients of the set of kernels are arranged column-wise serially in the merged kernel 108. Each kernel has equal number of rows and columns. For the sake of ongoing discussion and without limiting the scope of the disclosure, it is assumed that dimensions of each kernel are 'H'בH', for example, 3×3, 5×5, 7×7, and 11×11.

The memory 102 is further configured to store a plurality of skip values 110 and a pixel base address 112. Each skip value of the plurality of skip values 110 corresponds to a location offset of each non-zero coefficient with respect to a previous non-zero coefficient of the plurality of non-zero coefficients. The location offset corresponding to each skip value includes a row offset and a column offset. The row offset indicates a number of rows between the corresponding non-zero coefficient and the previous non-zero coefficient, and the column offset indicates a number of columns between the corresponding non-zero coefficient and the previous non-zero coefficient. Each non-zero coefficient of the plurality of non-zero coefficients has a corresponding skip value associated therewith. The pixel base address 112 is an address of a first pixel of the image 106. Examples of the memory 102 include, but are not limited to, a dynamic random-access memory (DRAM), a static random-access memory (SRAM), and the like.

The processing circuitry 104 is coupled with the memory 102, and configured to retrieve the image 106, the merged kernel 108, the plurality of skip values 110, and the pixel base address 112 from the memory 102. The processing circuitry 104 is configured to parallelly execute a multiply-accumulate (MAC) instruction and a load instruction in one clock cycle, for several times on a set of rows (shown later in FIG. 2) of the image 106 and the merged kernel 108 to convolve the image 106 with the merged kernel 108. In one example, the set of rows corresponds to the entire image 106. In another example, the set of rows corresponds to a portion of the image 106.

The convolution of the image 106 with the merged kernel 108 corresponds to generation of a set of feature maps 113. Each feature map of the set of feature maps 113 is a result of the convolution of the image 106 with coefficients of corresponding kernel of the set of kernels. In one example, when the first kernel indicates that edges are the feature to be extracted from the image 106, a first feature map (not shown) of the set of feature maps 113 includes all edges present in the image 106, and when the second kernel indicates that objects are the feature to be extracted from the image 106, a second feature map (not shown) of the set of feature maps 113 includes all objects present in the image 106. The processing circuitry 104 is further configured to store the set of feature maps 113 in the memory 102. In one embodiment, the set of feature maps 113 are utilized by a next convolution layer of the convolutional neural network to perform various image processing functions. In another embodiment, the set of feature maps 113 are utilized by a controller (not shown) for identification and classification of objects present in the image 106. It will be apparent to a person skilled in the art that each feature map of the set of feature maps 113 may correspond to a result of convolution of the merged kernel with a complete image frame or a portion of the image frame, without deviating from the scope of the present disclosure. Examples of the processing circuitry 104 include, but are not limited to, an application-specific integrated circuit processor, a reduced instruction set computing processor, a complex instruction set computing processor, a field-programmable gate array, and the like.

The processing circuitry 104 includes a load-store circuit 114, a vector register set 116, a weight register 118, a skip register 120, and a convolution circuit 122. The load-store circuit 114 is coupled with the memory 102, and configured to retrieve the image 106, the merged kernel 108, the plurality of skip values 110, and the pixel base address 112. The load-store circuit 114 is further coupled with the weight register 118 and the skip register 120, and further configured to load the merged kernel 108 in the weight register 118 to store the merged kernel 108 therein, and load the plurality of skip values 110 in the skip register 120 to store the plurality of skip values 110 therein. Further, the load-store circuit 114 is coupled with the vector register set 116, and configured to load rows associated with the plurality of non-zero coefficients in the vector register set 116 by executing the load instruction thereon such that one row is loaded in one clock cycle. Each row is loaded based on the pixel base address 112, a corresponding skip value of the plurality of skip values 110, and a width of each row.

A first row (shown later in FIG. 2) of the set of rows is associated with a first non-zero coefficient of the plurality of non-zero coefficients and a first skip value of the plurality of skip values 110. Thus, based on the pixel base address 112, the first skip value, and the width of each row, the load-store circuit 114 loads, by executing the load instruction on the first row, the first row of the set of rows in a first vector register (shown later in FIG. 3A) of the vector register set 116 to store the first row therein. A second row (shown later in FIG. 2) of the set of rows is associated with a first zero coefficient (i.e., coefficient having a value zero) of the first kernel. As the first zero coefficient is not included in the merged kernel 108, loading of the second row is skipped. A third row (shown later in FIG. 2) of the set of rows is associated with a second non-zero coefficient of the plurality of non-zero coefficients and a second skip value of the plurality of skip values 110. Thus, based on the pixel base address 112, the second skip value of the plurality of skip values 110, and the width of each row, the load-store circuit 114 loads, by executing the load instruction on the third row, the third row in a second vector register (shown later in FIG. 3B) of the vector register set 116 to store the third row therein. In one example, the first row is loaded in one clock cycle in the first vector register. After the first row is loaded in the first vector register, the third row is loaded in a subsequent clock cycle in the second vector register.

The vector register set 116 includes various vector registers that are configured to store various rows of the image 106. For example, the vector register set 116 includes the first and second vector registers that are configured to store the first and third rows, respectively. Each vector register of the vector register set 116 is an N-bit register, i.e., a width of each vector register is 'N'. Further, each vector register is configured to store 'N' elements of a corresponding row. A number of elements in each row (i.e., the width of each row) is determined based on the width of a corresponding vector register. In one embodiment, the width of each row is equal to the width of each vector register. In such a scenario, each vector register stores one row of the image 106. In another embodiment, a width of each row of the image 106 is at most half of the width of each vector register. In such a scenario, each vector register stores at least two rows of the image 106. For example, when the width of each row of the image 106 is '32' and the width of each vector register is '64', each vector register stores two rows of the image 106. Similarly, when the width of each row of the image 106 is '16' and the width of each vector register is '64', each vector register stores four rows of the image 106.

The weight register 118 is configured to store the merged kernel 108. A width of the weight register 118 is equal to the width of each vector register. Thus, the weight register 118 is an N-bit register, i.e., the width of the weight register 118 is 'N'. The weight register 118 is further configured to store, at a time, a number of non-zero coefficients of the plurality of non-zero coefficients that is equal to the width of the weight register 118 (i.e., 'N'). In the presently preferred embodiment, the number of non-zero coefficients of the plurality of non-zero coefficients is less than the width of the weight register 118, and the weight register 118 stores all non-zero coefficients associated with each column of each kernel. The plurality of non-zero coefficients are stored in the weight register 118 in a column-wise serial manner.

The skip register 120 is configured to store the plurality of skip values 110. A width of the skip register 120 is equal to the width of the weight register 118. Thus, the skip register 120 is an N-bit register, i.e., the width of the skip register 120 is 'N'. The skip register 120 is configured to store at a time, a number of skip values of the plurality of skip values 110 that is equal to the width of the skip register 120 (i.e., 'N'). In the presently preferred embodiment, the number of skip values of the plurality of skip values 110 is less than the width of the skip register 120, and the skip register 120 stores all skip values of the plurality of skip values 110.

The convolution circuit 122 is coupled with the vector register set 116 and the weight register 118, and configured to receive rows associated with the plurality of non-zero coefficients and the merged kernel 108. The convolution circuit 122 is further configured to execute the MAC instruction a plurality of times on the received rows and the merged kernel 108 for convolving the received rows and the merged kernel 108. The MAC instruction and the load instruction include first and second pluralities of instructions, respectively, in a very long instruction word (VLIW) architecture. Each instruction of the first and second pluralities of instructions corresponds to a single instruction multiple data (SIMD) instruction. To execute the MAC instruction, the convolution circuit 122 is further configured to execute multiplication and accumulation operations on a loaded row and an associated non-zero coefficient, and a logical shift operation on the merged kernel 108. Further, the MAC instruction supports byte operations and half-word operations, i.e., the MAC instruction may be executed on one of an 8-bit or 16-bit operand.

A number of times the MAC instruction is executed for each kernel is based on a number of rows in the set of rows and a number of non-zero coefficients associated with all columns of each kernel. In the presently preferred embodiment, the convolution circuit 122 executes the MAC instruction 'X' times for convolving 'X' rows with 'X' non-zero coefficients that are associated with a first column of the first kernel. In one example, the convolution circuit 122 executes the MAC instruction two times for convolving two rows of the set of rows with two non-zero coefficients associated with the first column of the first kernel.

The convolution circuit 122 includes a plurality of multipliers 124 of which first, second, and sixty-fourth multipliers are shown later in FIGS. 3A and 3B, an accumulation register 126, and first and second shifter circuits 128a and 128b. The plurality of multipliers 124 are coupled with the vector register set 116 and the weight register 118, and configured to receive rows associated with the plurality of non-zero coefficients and the merged kernel 108. The plurality of multipliers 124 are configured to execute the multiplication operation for multiplying each element associated with each row with a corresponding non-zero coefficient of the merged kernel 108 to generate several multiplication outputs.

The accumulation register 126 is coupled with the plurality of multipliers 124, and configured to receive the multiplication outputs, and execute the accumulation operation to accumulate the multiplication outputs therein. In one example, the accumulation register 126 accumulates a first result of convolution between 'X' rows and 'X' non-zero coefficients associated with the first column of the first kernel, and is further configured to store the first result in a first buffer register (not shown) of the convolution circuit 122. Similarly, the accumulation register 126 accumulates second and third results, i.e., convolution of non-zero coefficients associated with the first columns of the second kernel and a third kernel (shown later in FIG. 2) of the set of kernels with the corresponding rows. The accumulation register 126 stores the second and third results in second and third buffer registers (not shown) of the convolution circuit 122, respectively.

After convolution of the non-zero coefficients associated with the first columns of each kernel is completed, a value of the pixel base address 112 is incremented by one. The load-store circuit 114 thus loads next rows associated with non-zero coefficients that are associated with a second columns of each kernel based on the incremented pixel base address 112. Further, the accumulation register 126 retrieves the contents of the first buffer register (i.e., the first result). The accumulation register 126 accumulates, along with the first result, a fourth result associated with the convolution of the next rows of the set of rows associated with the non-zero coefficients that are associated with the second column of the first kernel therein. The accumulation register 126 further stores the accumulated fourth and first results in the first buffer register. Similarly, after convolution of each column of all kernels, the value of the pixel base address 112 is incremented by one. It will be understood by those of skill in the art that the above-mentioned process is performed for the remaining non-zero coefficients associated with all columns of each kernel. The multiplication and accumulation operations are thus executed on a row (such as the first row) by the convolution circuit 122 for a number of times that is based on the width of each vector register (i.e., 'N') in a corresponding clock cycle.

Although in the current embodiment, the convolution circuit 122 includes a single accumulation register (i.e., the accumulation register 126), it will be apparent to a person skilled in the art that the scope of the present disclosure is not limited to it. In various other embodiments, the convolution circuit 122 may include more than one accumulation register such that a number of accumulation registers is equal to a number of kernels in the set of kernels, without deviating from the scope of the present disclosure. In such a scenario, the first through third results are accumulated and stored by different accumulation registers (not shown) of the convolution circuit 122 such that each accumulation register accumulates results corresponding to a single kernel. Additionally, the fourth result is accumulated by an accumulation register that stores the first result.

The first shifter circuit 128a is coupled with the weight register 118, and configured to receive the merged kernel 108. The first shifter circuit 128a is further configured to execute the logical shift operation on the merged kernel 108, and provide the shifted merged kernel 108 to the weight register 118. In the logical shift operation on the merged kernel 108, a current non-zero coefficient of the merged kernel 108 is shifted by replacing the current non-zero coefficient with a subsequent non-zero coefficient of the merged kernel 108 such that all non-zero coefficients of the merged kernel 108 are rotated circularly by one position at a time. In one example, all non-zero coefficients of the merged kernel 108 are rotated circularly to the right. The current non-zero coefficient such as the first non-zero coefficient corresponding to the first column of the first kernel, is shifted when a set of elements associated with a currently loaded row (such as the first row) in a corresponding vector register (such as the first vector register) is multiplied with the current non-zero coefficient. Further, the subsequent non-zero coefficient of the merged kernel 108 is multiplied with a set of elements of a row of the set of rows corresponding to the subsequent non-zero coefficient. The shifted merged kernel 108 is provided to the weight register 118 after the execution of each logical shift operation.

The second shifter circuit 128b is coupled with the skip register 120, and configured to receive the plurality of skip values 110. The second shifter circuit 128b is further configured to execute the logical shift operation on the plurality of skip values 110, and provide the shifted plurality of skip values 110 to the skip register 120. In the logical shift operation on the plurality of skip values 110, a current skip value of the plurality of skip values 110 is shifted by replacing the current skip value with a subsequent skip value of the plurality of skip values 110 such that all skip values of the plurality of skip values 110 are rotated circularly by one position at a time. In one example, all skip values of the plurality of skip values 110 are rotated circularly to the right. The current skip value (such as the first skip value) is shifted when the MAC instruction is executed on a currently loaded row (such as the first row) and a current non-zero coefficient (such as the first non-zero coefficient) associated with the currently loaded row. Further, a next row of the set of rows is loaded in a subsequent vector register based on the subsequent skip value of the plurality of skip values 110. The shifted plurality of skip values 110 are provided to the skip register 120 after the execution of each logical shift operation.

When all rows of the set of rows associated with all non-zero coefficients of the plurality of non-zero coefficients are thus convolved with the merged kernel 108, the convolution circuit 122 generates a completion notification and provides the completion notification to the load-store circuit 114. In other words, the completion notification is generated when the image 106 is convolved with the merged kernel 108 completely to generate the set of feature maps 113. Each feature map includes an extracted feature (e.g., edges or objects) of the image 106 based on a corresponding kernel. In one example, when the first kernel of the set of kernels is an edge detection kernel, the first feature map includes edges extracted from the image 106. In addition to receiving the completion notification, the load-store circuit 114 is further configured to receive the set of feature maps 113 from the convolution circuit 122 and store the set of feature maps 113 in the memory 102. Further, the load-store circuit 114 retrieves a subsequent image (not shown) of the set of images from the memory 102 to convolve the subsequent image with the merged kernel 108.

Figure 2:
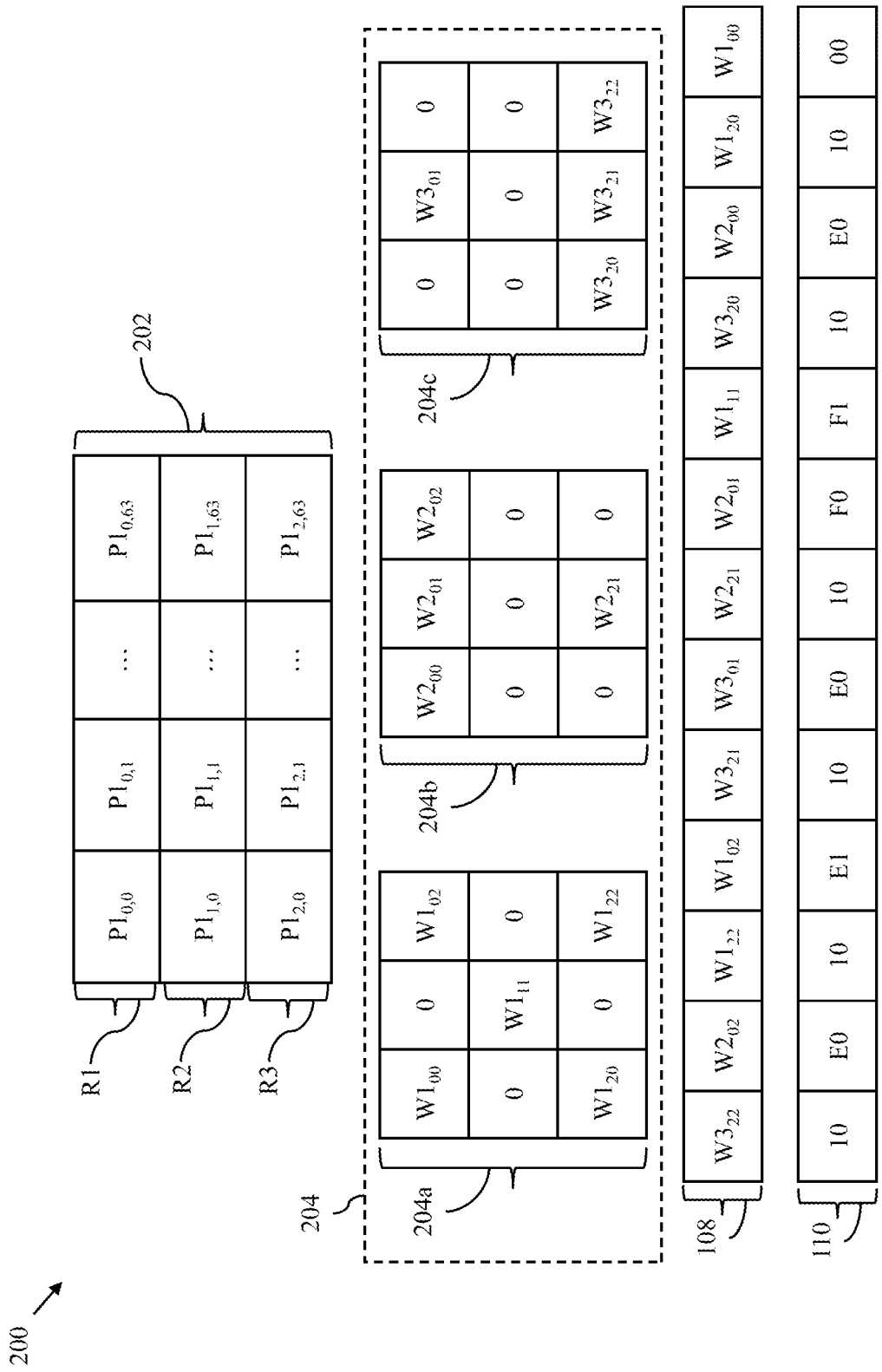
FIG. 2 is a matrix representation of a set of rows of an image, a set of kernels to be convolved with the image, a merged kernel, and a plurality of skip values of FIG. 1 in accordance with an embodiment of the present disclosure.

FIG. 2 is a matrix representation 200 of the set of rows, the set of kernels to be convolved with the image 106, the merged kernel 108, and the plurality of skip values 110 in accordance with an embodiment of the present disclosure.

The set of rows (hereinafter referred to and designated as "the set of rows 202") includes multiple rows of which the first through third rows (hereinafter referred to and designated as "the first through third rows R1-R3") are shown. In one example, the first row R1 has elements $P1_{0,0}$, $P1_{0,1}, \ldots, P1_{0,63}$ of the image 106, the second row R2 has elements $P1_{1,0}, P1_{1,1}, \ldots, P1_{1,63}$ of the image 106, and the third row R3 has elements $P1_{2,0}, P1_{2,1}, \ldots, P1_{2,63}$ of the image 106.

The set of kernels (hereinafter referred to and designated as "the set of kernels 204") include the first through third kernels (hereinafter referred to and designated as "the first through third kernels 204a-204c"). The first column of the first kernel 204a includes coefficients $W1_{00}$, '0', and $W1_{20}$, the second column of the first kernel 204a includes coefficients '0', $W1_{11}$, and '0', and a third column of the first kernel 204a includes coefficients $W1_{02}$, '0', and $W1_{22}$. Further, first, second, and third columns of the second kernel 204b include coefficients $W2_{00}$, '0', and '0'; $W2_{01}$, '0', and $W2_{21}$; and $W2_{02}$, '0', and '0', respectively, and first, second, and third columns of the third kernel 204c include coefficients '0', '0', and $W3_{20}$; $W3_{01}$, '0', and $W3_{23}$; and '0', '0', and $W3_{22}$, respectively. As the first through third kernels 204a-204c include significant number of coefficients having a value '0', the first through third kernels 204a-204c are referred to as sparse kernels. It will be apparent to those of skill in the art that the scope of the disclosure is not limited to the first through third kernels 204a-204c but may include any number of kernels for extracting corresponding features from the image 106.

The merged kernel 108 is generated by merging serially all non-zero coefficients of the first through third kernels 204a-204c column-wise such that a number of columns of each of the first through third kernels 204a-204c are merged one after the other in a serial manner. The merged kernel 108 thus includes the plurality of non-zero coefficients $W1_{00}$, $W1_{20}$, $W2_{00}$, $W3_{20}$, $W1_{11}$, $W2_{01}$, $W2_{21}$, $W3_{01}$, $W3_{21}$, $W1_{02}$, $W1_{22}$, $W2_{02}$, and $W3_{22}$. In one embodiment, the merged kernel 108 is generated such that the first non-zero coefficient $W1_{00}$ of the first kernel 204a is a Least Significant Bit (LSB) of the merged kernel 108. In another embodiment, the merged kernel 108 is generated such that the first non-zero coefficient $W1_{00}$ of the first kernel 204a is a Most Significant Bit (MSB) of the merged kernel 108. For the sake of ongoing discussion, it is assumed that the merged kernel 108 is generated such that the first non-zero coefficient $W1_{00}$ of the first kernel 204a is the LSB of the merged kernel 108.

The plurality of skip values 110 are generated such that each skip value represents the location offset of a corresponding non-zero coefficient of the plurality of non-zero coefficients with respect to a previous non-zero coefficient of the plurality of non-zero coefficients. In one embodiment, the plurality of skip values 110 are generated by the analysis engine based on the set of kernels 204 and the plurality of non-zero coefficients. The plurality of skip values 110 include a skip value for each non-zero coefficient of the merged kernel 108. The plurality of skip values 110 thus include the skip values '00', '10', 'E0', '10', 'F1', 'F0', 'E0', '10', 'E1', '10', 'E0', and '10'. In one example, each skip value has eight bits of which first four bits correspond to the row offset and remaining four bits correspond to the column offset. The plurality of skip values 110 are thus utilized by the load-store circuit 114 to load each row of the set of rows 202 that is associated with each non-zero coefficient in the merged kernel 108. In one embodiment, the plurality of skip values 110 are generated such that the first skip value '00' corresponding to the first non-zero coefficient $W1_{00}$ is an LSB of the plurality of skip values 110. In another embodiment, the plurality of skip values 110 are generated such that the first skip value '00' corresponding to the first non-zero coefficient $W1_{00}$ is an MSB of the plurality of skip values 110. For the sake of ongoing discussion, it is assumed that the plurality of skip values 110 are generated such that the first skip value '00' corresponding to the first non-zero coefficient $W1_{00}$ is the LSB of the plurality of skip values 110.

Figure 3B:
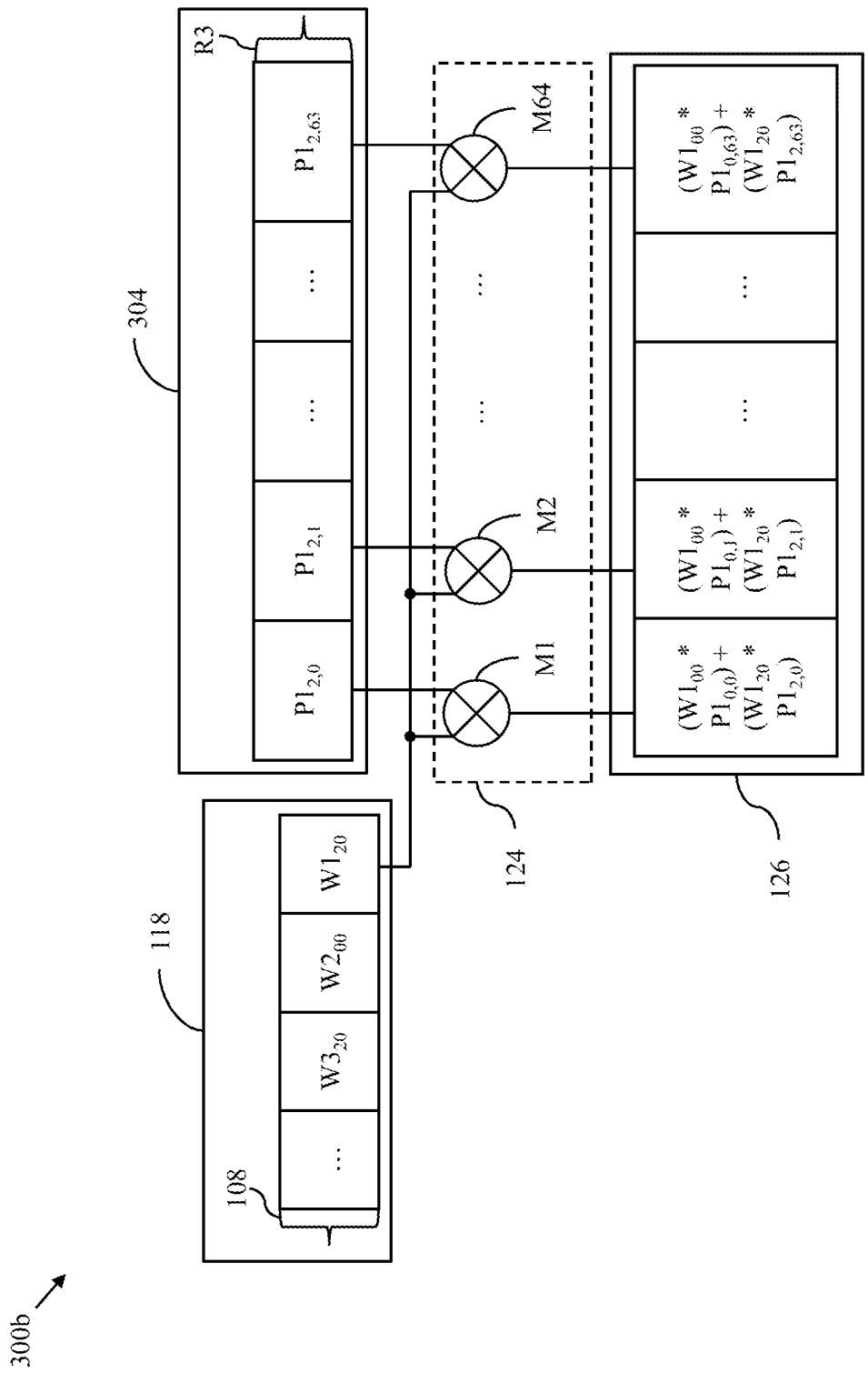

FIGS. 3A and 3B are block diagrams 300a and 300b that, collectively, illustrate convolution of the first and third rows R1 and R3 with the merged kernel 108 in accordance with an embodiment of the present disclosure. For the sake of brevity, the convolution of the first and third rows R1 and R3 is explained with the first and second non-zero coefficients $W1_{00}$ and $W1_{20}$ of the merged kernel 108.

Referring now to FIG. 3A, the block diagram 300a illustrates the execution of the MAC instruction on the first row R1 and the merged kernel 108. The merged kernel 108 is loaded by the load-store circuit 114 in the weight register 118. The first row R1 is loaded by the load-store circuit 114 in the first vector register (hereinafter referred to and designated as "the first vector register 302"). To load the first row R1, the load-store circuit 114 receives the pixel base address 112, the LSB of the plurality of skip values 110 (i.e., the first skip value) and the width of each row. Further, the load-store circuit 114 is configured to determine an address of the first row R1 in the image 106 based on the pixel base address 112, the first skip value, and the width of each row. In one example, the address of the first row R1 is determined by multiplying a row offset of the first skip value with the width of each row to generate an offset address, and adding the offset address to the pixel base address 112.

A first multiplier M1 of the plurality of multipliers 124 receives a first element $P1_{0,0}$ of the first row R1 as a first input, and an LSB of the merged kernel 108 (i.e., $W1_{00}$) as a second input. The first multiplier M1 multiplies the first element $P1_{0,0}$ and the LSB of the merged kernel 108 to generate a first multiplication output $W1_{00}*P1_{0,0}$. Similarly, second through sixty-fourth multipliers M2, ..., M64 of the plurality of multipliers 124 multiply the second through sixty-fourth elements $P1_{0,1}, \ldots, P1_{0,63}$ of the first row R1 and the LSB of the merged kernel 108 to generate second through sixty-fourth multiplication outputs $W1_{00}*P1_{0,1}, \ldots, W1_{00}*P1_{0,63}$, respectively. The accumulation register 126 receives the first through sixty-fourth multiplication outputs $W1_{00}*P1_{0,0}, W1_{00}*P1_{0,1}, W1_{00}*P1_{0,63}$ and executes the accumulation operation to accumulate the first through sixty-fourth multiplication outputs $W1_{00}*P1_{0,0}, W1_{00}*P1_{0,1}, \ldots, W1_{00}*P1_{0,63}$.

The first shifter circuit 128a executes the logical shift operation on the merged kernel 108 when the first through sixty-fourth multiplication outputs $W1_{00}*P1_{0,0}, W1_{00}*P10,1, \ldots, W1_{00}*P1_{0,63}$ are accumulated in the accumulation register 126. The logical shift operation on the merged kernel 108 shifts the first non-zero coefficient $W1_{00}$ towards right by a single position such that the first non-zero coefficient $W1_{00}$ is replaced with the second non-zero coefficient $W1_{20}$ of the merged kernel 108, thereby leading to the second non-zero coefficient $W1_{20}$ becoming the LSB of the merged kernel 108. The second shifter circuit 128b executes the logical shift operation on the plurality of skip values 110 when the MAC instruction is executed on the first row R1 and the merged kernel 108. The logical shift operation on the plurality of skip values 110 shifts the first skip value '00' towards right by a single position such that the first skip value is replaced with the second skip value '10' of the plurality of skip values 110, thereby leading to the second skip value becoming the LSB of the plurality of skip values 110.

Although in the current embodiment, the logical shift operation on the merged kernel 108 and the plurality of skip values 110 shifts the first non-zero coefficient $W1_{00}$ and the first skip value '00' towards right by a single position, it will be apparent to a person skilled in the art that the scope of the present disclosure is not limited to it. In various other embodiments, the logical shift operation on the merged kernel 108 and the plurality of skip values 110 shifts the first non-zero coefficient $W1_{00}$ and the first skip value '00' towards left by a single position, without deviating from the scope of the present disclosure.

Referring now to FIG. 3B, the block diagram 300b illustrates the execution of the MAC instruction on the third row R3 and the merged kernel 108. The third row R3 is loaded by the load-store circuit 114 in the second vector register (hereinafter referred to and designated as "the second vector register 304"). To load the third row R3, the load-store circuit 114 receives the pixel base address 112, the LSB of the plurality of skip values 110 (i.e., the second skip value), and the width of each row, and determines an address of the third row R3 in the image 106. Thus, the second row R2 that is associated with the first zero-coefficient of the first kernel 204a is skipped.

Similar to the MAC instruction being performed on the first row R1, each of the first through sixty-fourth multipliers M1, M2, . . . , M64 receives and multiplies corresponding elements (i.e., $P1_{2,0}$, $P1_{2,1}$, . . . , $P1_{2,63}$) of the third row R3 (received as a first input) and the LSB of the merged kernel 108, i.e., $W1_{20}$ (received as a second input), to generate sixty-fifth through one-hundred and twenty-eighth multiplication outputs $W1_{20}*P1_{2,0}$, $W1_{20}*P1_{2,1}$, $W1_{20}*P1_{2,63}$, respectively. The accumulation register 126 receives the sixty-fifth through one-hundred and twenty-eighth multiplication outputs $W1_{20}*P1_{2,0}$, $W1_{20}*P1_{2,1}$, $W1_{20}*P1_{2,63}$ and executes the accumulation operation to accumulate the sixty-fifth through one-hundred and twenty-eighth multiplication outputs $W1_{20}*P1_{2,0}$, $W1_{20}*P1_{2,1}$, . . . , $W1_{20}*P1_{2,63}$ along with the first through sixty-fourth multiplication outputs $W1_{00}*P1_{0,0}$, $W1_{00}*P1_{0,1}$, $W1_{00}*P1_{0,63}$. Thus, the accumulation register 126 accumulates the first result, i.e., $W1_{00}*P1_{0,0}+W1_{20}*P1_{2,0}$, $W1_{00}*P1_{20}+W1_{20}*P1_{2,1}$, . . . , $W1_{00}*P1_{0,63}+W1_{20}*P1_{2,63}$.

The first shifter circuit 128a executes the logical shift operation on the merged kernel 108 to replace the second non-zero coefficient W170 with a third non-zero coefficient $W2_{00}$ of the merged kernel 108. The second shifter circuit 128b executes the logical shift operation on the plurality of skip values 110 to replace the second skip value with a third skip value 'E0' of the plurality of skip values 110.

After the convolution of the first and third rows R1 and R3 with the first and second non-zero coefficients $W1_{00}$ and $W1_{20}$ that are associated with the first column of the first kernel 204a, a result of the convolution (i.e., the first result) is accumulated in the first buffer register. Similarly, the accumulation register 126 stores the second and third results, i.e., convolution of non-zero coefficients associated with the first columns of the second and third kernels 204b and 204c (i.e., $W2_{00}$ and $W3_{20}$) with the first and third rows R1 and R3 rows in the second and third buffer registers (not shown), respectively. For accumulating the fourth result associated with the convolution of next rows of the set of rows 202 with the non-zero coefficients associated with the second column of the first kernel 204a (i.e. $W1_{11}$), the accumulation register 126 retrieves the contents of the first buffer register (i.e., the first result). The accumulation register 126 further accumulates the fourth result with the first result, and stores the accumulated fourth and first results in the first buffer register. It will be understood by those of skill in the art that above process of executing the MAC instruction and the load instruction is performed for the remaining non-zero coefficients of the merged kernel 108 to convolve the merged kernel 108 with the corresponding rows of the image 106.

FIG. 4 is a table 400 illustrating operations performed at each clock cycle by the load-store circuit 114 and the convolution circuit 122 in accordance with an embodiment of the present disclosure. For the sake of simplicity of the ongoing discussion and without deviating from the scope of the disclosure, the operations performed in five clock cycles are explained.

In a first clock cycle, the load-store circuit 114 loads the merged kernel 108 in the weight register 118. In a subsequent clock cycle (i.e., a second clock cycle) the load-store circuit 114 loads the plurality of skip values 110 in the skip register 120.

In a third clock cycle, the load-store circuit 114 loads the first row R1 in the first vector register 302. The first row R1 is associated with the first non-zero coefficient (i.e., $W1_{00}$).

In a fourth clock cycle, the convolution circuit 122 executes the MAC instruction on the first row R1 and the merged kernel 108 as described in FIG. 3A, and the load-store circuit 114 loads the third row R3 in the second vector register 304. The third row R3 is associated with the second non-zero coefficient (i.e., $W1_{20}$).

In a fifth clock cycle, the convolution circuit 122 executes the MAC instruction on the third row R3 and the merged kernel 108 as described in FIG. 3B, and the load-store circuit 114 loads a next row of the set of rows 202 associated with a subsequent non-zero coefficient of the merged kernel 108 in a subsequent vector register of the vector register set 116. It will be understood by a person skilled in the art that in a scenario when the next row associated with the subsequent non-zero coefficient (i.e., $W2_{00}$) is the first row R1, the load-store circuit 114 skips loading of the first row R1 again and the MAC instruction is executed on the first row R1 that is already loaded in the first vector register 302.

The MAC and load instructions are thus executed simultaneously on different rows in each clock cycle starting from the fourth clock cycle until the image 106 is convolved completely with the merged kernel 108. Hence, the convolution circuit 122 executes the MAC instruction on the currently loaded row (example, the first row R1) and the merged kernel 108, and the load-store circuit 114 loads a next row (example, the second row R2) of the set of rows 202 that is associated with a subsequent non-zero coefficient (example, the second non-zero coefficient) in a subsequent vector register (example, the second vector register 304) in the same clock cycle.

FIGS. 5A-5D, collectively, represent a flow chart 500 that illustrates a method for convolving the image 106 by the processing circuitry 104 in accordance with an embodiment of the present disclosure.

Figure 5A:
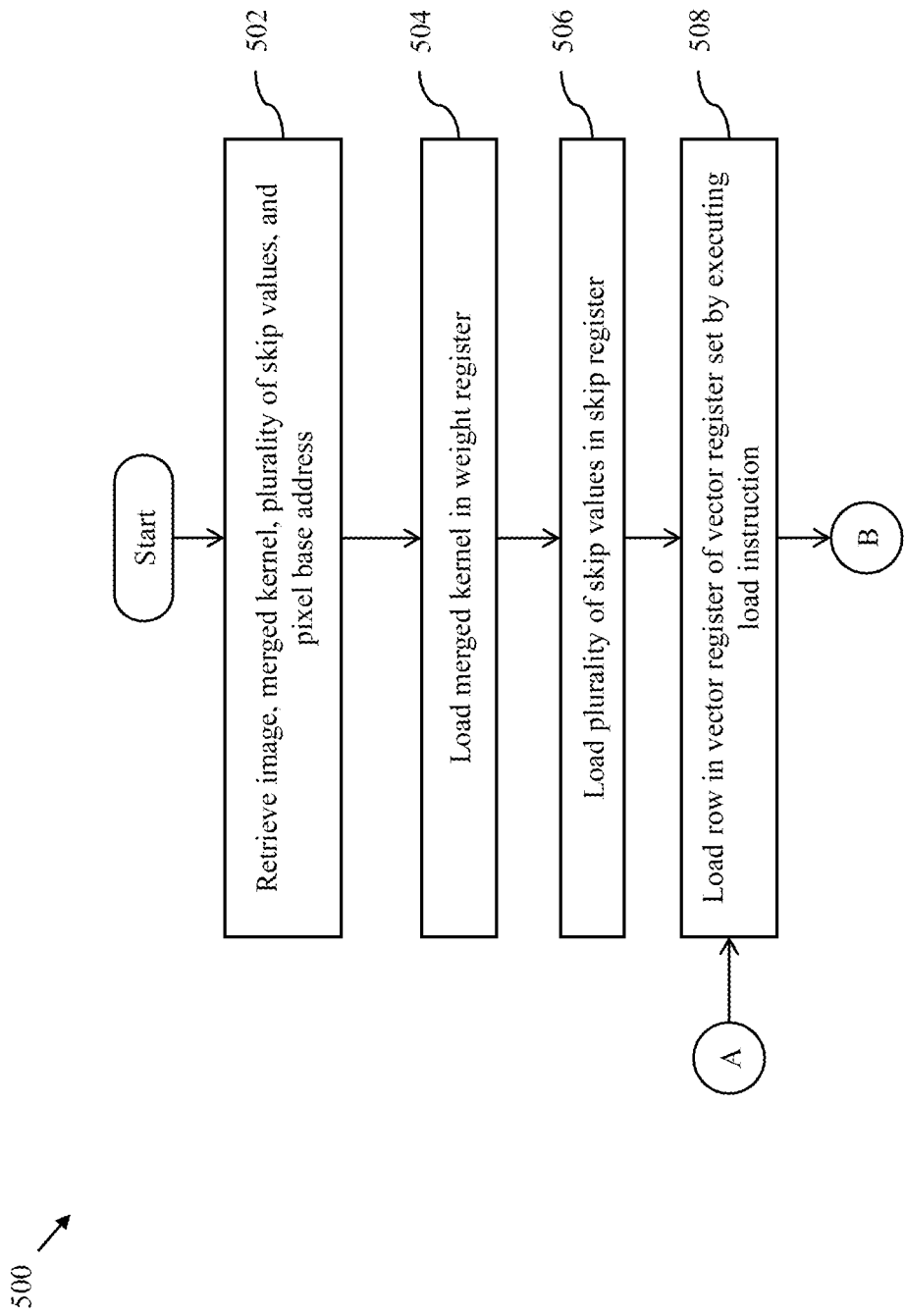

Referring now to FIG. 5A, at step 502, the load-store circuit 114 retrieves the image 106, the merged kernel 108, the plurality of skip values 110, and the pixel base address 112 from the memory 102. At step 504, the load-store circuit 114 loads the merged kernel 108 in the weight register 118 to store the merged kernel 108 therein. At step 506, the load-store circuit 114 loads the plurality of skip values 110 in the skip register 120 to store the plurality of skip values 110 therein. At step 508, the load-store circuit 114 loads the first row R1 in a corresponding clock cycle in the first vector register 302 to store the first row R1 therein by executing the load instruction.

Referring now to FIG. 5B, at step 510, the processing circuitry 104 (i.e., the load-store circuit 114 and the convolution circuit 122) executes for plurality of times, the MAC instruction and the load instruction parallelly in one clock cycle on the set of rows 202 and the merged kernel 108, to convolve the image 106 with the merged kernel 108.

Figure 5C:
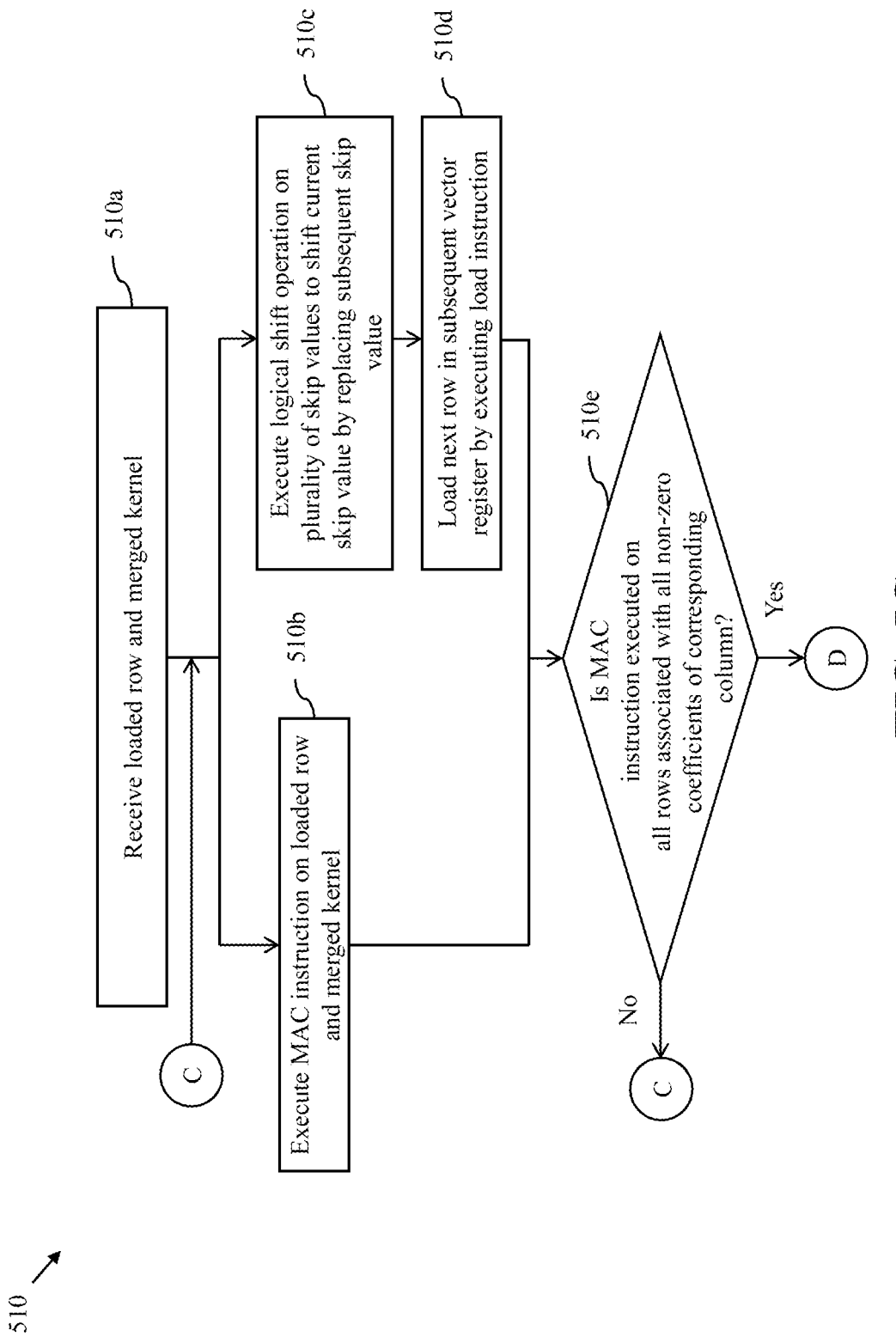

Referring now to FIG. 5C, at step 510a, the convolution circuit 122 receives the loaded row (such as the first row R1) and the merged kernel 108 from the corresponding vector register (such as the first vector register 302) and the weight register 118, respectively. After step 510a, steps 510b and 510c are executed. At step 510b, the convolution circuit 122 executes the MAC instruction on the loaded row (such as the first row R1) and the merged kernel 108. At step 510c, the second shifter circuit 128b executes the logical shift operation on the plurality of skip values 110 to shift a current skip value of the plurality of skip values 110 by replacing the current skip value with a subsequent skip value of the plurality of skip values 110 such that all skip values of the plurality of skip values 110 are rotated circularly by one position. At step 510d, the load-store circuit 114 loads a next row (such as the second row R2) in a subsequent vector register (such as the second vector register 304) by executing the load instruction. The next row is associated with a subsequent non-zero coefficient of the merged kernel 108. Steps 510c and 510d are executed parallelly with step 510b. After steps 510b and 510d, step 510e is executed.

At step 510e, the convolution circuit 122 determines whether the MAC instruction is executed on all rows (i.e., the first and third rows R1 and R3) associated with all non-zero coefficients (i.e., $W1_{00}$ and $W1_{20}$) of a corresponding column of one kernel (such as the first column of the first kernel 204a). If at step 510e, the convolution circuit 122 determines that the MAC instruction is not executed on all rows associated with all non-zero coefficients of the corresponding column, the steps 510b-510d are repeated until the MAC instruction is executed on all rows associated with all non-zero coefficients of the corresponding column. If at step 510d, the convolution circuit 122 determines that the MAC instruction is executed on all rows associated with all non-zero coefficients of the corresponding column, step 510f is executed.

Figure 5D:
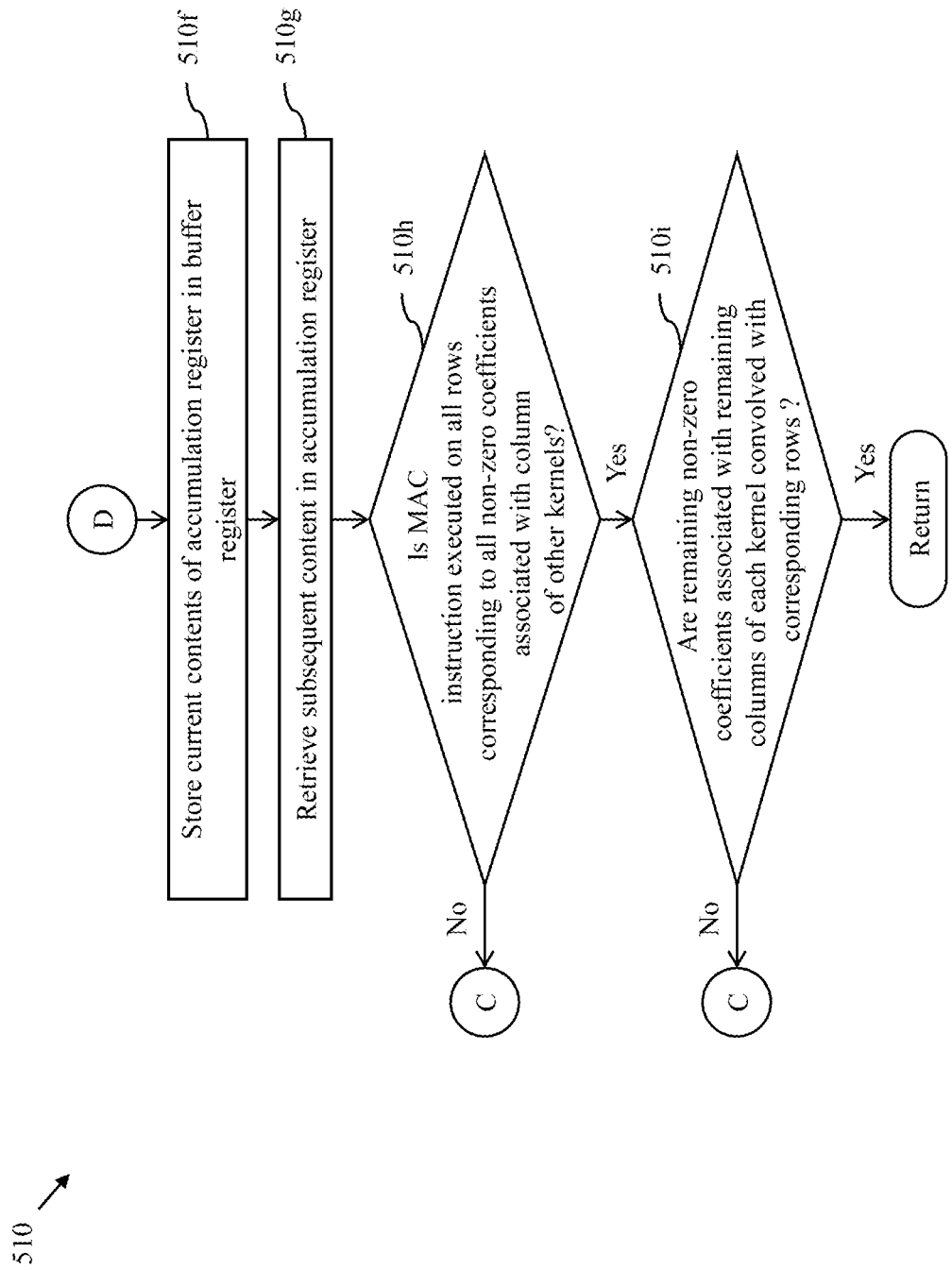

Referring now to FIG. 5D, at step 510f, the accumulation register 126 stores the current contents (such as the first result) of the accumulation register 126 in the corresponding buffer register (such as the first buffer register). At step 510g, the accumulation register 126 retrieves from a subsequent buffer register (such as the second buffer register), subsequent content in the accumulation register 126. At step 510h, the convolution circuit 122 determines whether the MAC instruction is executed on all rows corresponding to all non-zero coefficients ($W2_{00}$ and $W3_{20}$) associated with a corresponding column (i.e., the first column) of other kernels (the second and third kernels 204b and 204c). If at step 510h, the convolution circuit 122 determines that the MAC instruction is not executed on all rows corresponding to all non-zero coefficients associated with the corresponding column of other kernels, the steps 510b-510g are repeated until the MAC instruction is executed on all rows corresponding to all non-zero coefficients associated with the corresponding columns of other kernels. If at step 510h, the convolution circuit 122 determines that the MAC instruction is executed on all rows corresponding to all non-zero coefficients associated with the corresponding columns of other kernels, step 510i is executed.

At step 510i, the convolution circuit 122 determines whether all remaining non-zero coefficients (i.e., $W1_{11}$, $W2_{01}$, $W1_{21}$, $W3_{01}$, $W3_{21}$, $W1_{02}$, $W1_{22}$, $W2_{02}$, and $W3_{22}$) associated with the remaining columns (i.e., the second and third columns) of each kernel (i.e., the first through third kernels 204a-204c) are convolved with corresponding rows of the set of rows 202. If at step 510i, the convolution circuit 122 determines that all remaining non-zero coefficients associated with the remaining columns of each kernel are not convolved, the steps 510b-510h are repeated for the remaining non-zero coefficients. If at step 510i, the convolution circuit 122 determines that all remaining non-zero coefficients associated with the remaining columns of each kernel are convolved with the corresponding rows, step 512 is executed.

Referring back to FIG. 5B, at step 512, the convolution circuit 122 determines whether the image 106 is convolved completely, i.e., each remaining row of the set of rows 202 is convolved with all corresponding non-zero coefficients in the merged kernel 108 associated with each kernel. If at step 512, the convolution circuit 122 determines that the image 106 is not convolved completely, the steps 508 and 510 are repeated. If at step 512, the convolution circuit 122 determines that the image 106 is convolved completely (i.e., the set of feature maps 113 are generated), the step 514 is executed. At step 514, the convolution circuit 122 generates the completion notification. The load-store circuit 114 receives the completion notification and the set of feature maps 113 from the convolution circuit 122. At step 516, the load-store circuit 114 stores the set of feature maps 113 in the memory 102. In a scenario, when the image 106 corresponds to a portion of the image frame, the processing circuitry 104 convolves remaining portions of the image frame with the merged kernel 108 in a similar manner as described above. It will be apparent to those of skill in the art that the processing circuitry 104 may convolve remaining images of the set of images with a corresponding merged kernel in a similar manner as described above.

Figure 6:
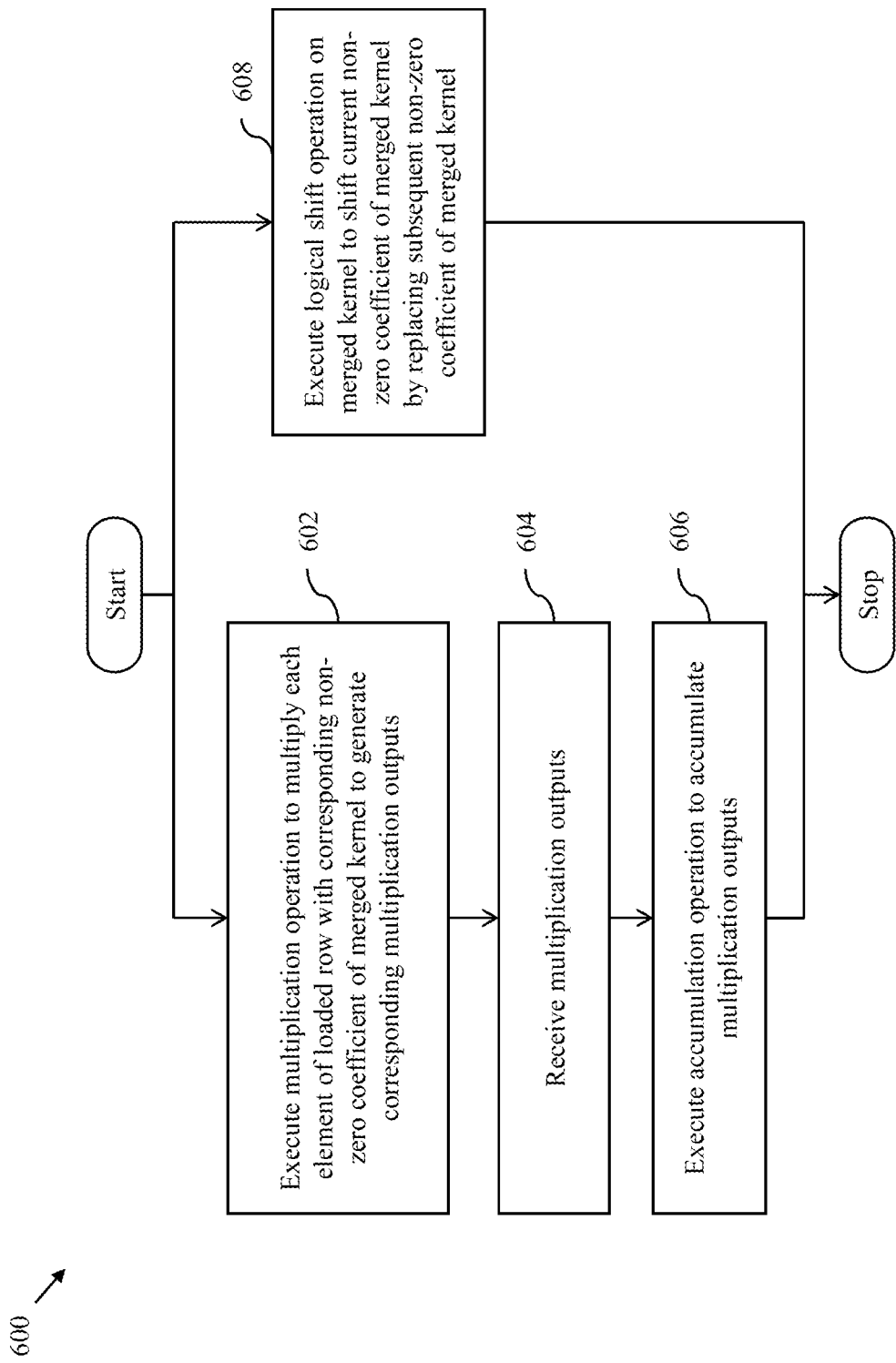
FIG. 6 is a flow chart that illustrates a method for executing a multiply-accumulate (MAC) instruction by the convolution circuit of the image processing system of FIG. 1 on a currently loaded row associated with a corresponding non-zero coefficient in accordance with an embodiment of the present disclosure.

FIG. 6 is a flow chart 600 that illustrates a method for executing the MAC instruction by the convolution circuit 122 on a currently loaded row associated with a corresponding non-zero coefficient, in accordance with an embodiment of the present disclosure.

At step 602, the plurality of multipliers 124 execute the multiplication operation to multiply each element of the loaded row with the corresponding non-zero coefficient of the merged kernel 108 to generate the corresponding multiplication outputs. At step 604, the accumulation register 126 receives the multiplication outputs from the plurality of multipliers 124. At step 606, the accumulation register 126 executes the accumulation operation to accumulate the multiplication outputs therein.

At step 608, the first shifter circuit 128a executes the logical shift operation on the merged kernel 108 to shift the current non-zero coefficient of the merged kernel 108 by replacing the current non-zero coefficient with a subsequent non-zero coefficient of the merged kernel 108 such that all non-zero coefficients of the merged kernel 108 are rotated circularly by one position. The steps 602-606 and step 608 are executed parallelly in one clock cycle by the convolution circuit 122. It will be understood by those of skill in the art that the convolution circuit 122 executes the MAC instruction on each row associated with each non-zero coefficient in the merged kernel 108 in a similar manner as described above.

The image processing system 100 eliminates the need for loading rows of the set of rows 202 that are associated with coefficients of the set of kernels 204 having a value zero, as each row is loaded by the load-store circuit 114 based on the pixel base address 112, a corresponding skip value, and the width of each row. Further, the merged kernel 108 is loaded at once in the weight register 118. Hence, a memory bandwidth requirement of the image processing system 100 is less as compared to conventional image processing systems. The MAC instruction, i.e., the multiplication and accumulation operations executed on the current row and the logical shift operation for shifting coefficients of the merged kernel 108, along with the load instruction, i.e., the load operation executed on a next row associated with the subsequent non-zero coefficient, are performed in the same clock cycle. Further, the need for executing the scalar load operation as implemented by the conventional image processing systems to load each coefficient is eliminated as the logical shift operation shifts the coefficients of the merged kernel 108 by shifting one coefficient at a time. Thus, all four operations (multiplication and accumulation, logical shift, and load operations) are performed at each clock cycle as compared to the conventional image processing systems that are unable to execute the multiplication and accumulation operations at each clock cycle due to interruption by the scalar load operation.

As the image processing system 100 skips loading rows of the set of rows 202 that are associated with coefficients of the set of kernels 204 that have value zero, the execution of the MAC instruction on the rows and the coefficients having values zero that results in an output with all values as zero is eliminated. Thus, a number of clock cycles consumed by the image processing system 100 and a power consumption of the image processing system 100 reduces, and a utilization of the image processing system 100 is improved as compared to the conventional image processing systems that were unable to skip loading of rows that are associated with coefficients having value zero.

While various embodiments of the present disclosure have been illustrated and described, it will be clear that the present disclosure is not limited to these embodiments only. Numerous modifications, changes, variations, substitutions, and equivalents will be apparent to those skilled in the art, without departing from the spirit and scope of the present disclosure, as described in the claims.

The invention claimed is:

1. An image processing system for convolving an image, the image processing system comprising:
 a memory that stores the image, a merged kernel, a plurality of skip values, and a pixel base address, wherein the merged kernel only includes a plurality of non-zero coefficients of a set of kernels, and wherein each skip value corresponds to a location offset of each non-zero coefficient with respect to a previous non-zero coefficient of the plurality of non-zero coefficients; and
 processing circuitry coupled to the memory, comprising:
  a plurality of registers;
  a load-store circuit configured to retrieve from the memory and store into the plurality of registers a set of rows of the image, the merged kernel, the plurality of skip values, and the pixel base address; and
  a convolution circuit configured to execute, for a plurality of times, a multiply-accumulate (MAC) instruction and a load instruction parallelly in one clock cycle on the set of rows of the image and the merged kernel to convolve the image with the merged kernel, wherein the MAC and load instructions are executed parallelly in one clock cycle on first and second rows of the set of rows, respectively, such that the first and second rows are associated with first and second non-zero coefficients of the plurality of non-zero coefficients and first and second skip values of the plurality of skip values, respectively, and wherein the load instruction on the second row is executed based on the pixel base address, the second skip value, and a width of each row of the set of rows.

2. The image processing system of claim 1, wherein the convolution of the image with the merged kernel corresponds to generation of a set of feature maps, and wherein the processing circuitry is further configured to store the set of feature maps in the memory.

3. The image processing system of claim 1, wherein the plurality of registers comprise:
 a vector register set comprising first and second vector registers that are configured to store the first and second rows, respectively;
 a weight register that is configured to store the merged kernel, wherein the plurality of non-zero coefficients of the set of kernels are arranged column-wise serially in the merged kernel; and
 a skip register that is configured to store the plurality of skip values, wherein the location offset corresponding to each skip value includes a row offset and a column offset.

4. The image processing system of claim 3, wherein the load-store circuit is coupled with the vector register set, the weight register, and the skip register, and configured to:
 load the merged kernel in the weight register to store the merged kernel therein;
 load the plurality of skip values in the skip register to store the plurality of skip values therein; and
 load, by executing the load instruction on the first row, the first row in the first vector register to store the first row therein, wherein the load-store circuit loads the first row in the first vector register based on the pixel base address, the first skip value, and the width of each row.

5. The image processing system of claim 4, wherein the load-store circuit is further configured to load, by executing the load instruction on the second row, the second row in the second vector register to store the second row therein, and wherein after the first row is loaded in the first vector register in one clock cycle, the second row is loaded in the second vector register in a subsequent clock cycle.

6. The image processing system of claim 3, wherein to execute the MAC instruction, the convolution circuit is further configured to execute (i) multiplication and accumulation operations on the first row and the first non-zero coefficient, and (ii) a logical shift operation on the merged kernel.

7. The image processing system of claim 6, wherein the convolution circuit is coupled with the vector register set and the weight register, and configured to receive the first and second rows and the merged kernel from the vector register set and the weight register, respectively, to execute the MAC instruction thereon.

8. The image processing system of claim 7, wherein the convolution circuit comprises:
 a plurality of multipliers that are coupled with the vector register set and the weight register, and configured to execute the multiplication operation to multiply each element associated with each row with a corresponding non-zero coefficient of the merged kernel and generate pluralities of multiplication outputs; and
 an accumulation register that is coupled with the plurality of multipliers, and configured to receive the pluralities of multiplication outputs and execute the accumulation operation to accumulate the pluralities of multiplication outputs therein.

9. The image processing system of claim 8, wherein the convolution circuit further comprises a first shifter circuit that is coupled with the weight register, and configured to execute the logical shift operation on the merged kernel to shift a current non-zero coefficient of the merged kernel by replacing the current non-zero coefficient with a subsequent non-zero coefficient of the merged kernel, when a first plurality of elements associated with the currently loaded row in the vector register are multiplied with the current non-zero coefficient.

10. The image processing system of claim 7, wherein the convolution circuit further comprises a second shifter circuit that is coupled with the skip register, and configured to execute the logical shift operation on the plurality of skip values to shift a current skip value of the plurality of skip values by replacing the current skip value with a subsequent skip value of the plurality of skip values.

11. The image processing system of claim 3, wherein when a width of the image is at most half of a width of each vector register of the vector register set, each vector register of the vector register set is configured to store at least two rows.

12. The image processing system of claim 1, wherein the MAC instruction and the load instruction include first and second pluralities of instructions, respectively, in a very long instruction word (VLIW) architecture, and wherein each instruction of the first and second pluralities of instructions corresponds to a single instruction multiple data (SIMD) instruction.

13. The image processing system of claim 1, wherein the convolution circuit is further configured to generate a completion notification when the image is convolved with the merged kernel completely.

14. A method for convolving an image, the method comprising:
retrieving, by processing circuitry from a memory, the image, a merged kernel, a plurality of skip values, and a pixel base address, wherein the merged kernel only includes a plurality of non-zero coefficients of a set of kernels, and wherein each skip value corresponds to a location offset of each non-zero coefficient with respect to a previous non-zero coefficient of the plurality of non-zero coefficients; and
executing, for a plurality of times by the processing circuitry, a multiply-accumulate (MAC) instruction and a load instruction parallelly in one clock cycle on a set of rows of the image and the merged kernel to convolve the image with the merged kernel, wherein the MAC and load instructions are executed parallelly in one clock cycle on first and second rows of the set of rows, respectively, such that the first and second rows are associated with first and second non-zero coefficients of the plurality of non-zero coefficients and first and second skip values of the plurality of skip values, respectively, and wherein the load instruction is executed based on the pixel base address, the second skip value, and a width of each row of the set of rows.

15. The method of claim 14, further comprising storing, by the processing circuitry, a set of feature maps in the memory, wherein the convolution of the image with the merged kernel corresponds to generation of the set of feature maps.

16. The method of claim 14, further comprises:
loading, by a load-store circuit of the processing circuitry, the merged kernel in a weight register of the processing circuitry to store the merged kernel therein;
loading, by the load-store circuit, the plurality of skip values in a skip register of the processing circuitry to store the plurality of skip values therein, wherein the location offset corresponding to each skip value includes a row offset and a column offset; and
loading, by the load-store circuit, the first row in a first vector register of a vector register set of the processing circuitry to store the first row therein by executing the load instruction on the first row, wherein the load-store circuit loads the first row in the first vector register based on the pixel base address, the first skip value, and the width of each row.

17. The method of claim 16, further comprising loading, by the load-store circuit, the second row in a second vector register of the vector register set to store the second row therein by executing the load instruction on the second row, wherein after the first row is loaded in the first vector register in one clock cycle, the second row is loaded in the second vector register in a subsequent clock cycle.

18. The method of claim 17, wherein executing the MAC instruction comprises executing (i) multiplication and accumulation operations on the first row and the first non-zero coefficient, and (ii) a logical shift operation on the merged kernel.

19. The method of claim 18, further comprises:
receiving, by a convolution circuit of the processing circuitry, the first and second rows and the merged kernel from the first and second vector registers and the weight register, respectively, to execute the MAC instruction thereon, wherein:
the multiplication and accumulation operations are executed by a plurality of multipliers and an accumulation register of the convolution circuit, respectively,
the multiplication operation is executed to multiply each element associated with each row with a corresponding non-zero coefficient of the merged kernel and generate pluralities of multiplication outputs, and the accumulation operation is executed to accumulate the pluralities of multiplication outputs in the accumulation register, and
the logical shift operation is executed by a shifter circuit of the convolution circuit on the merged kernel to shift a current non-zero coefficient of the merged kernel by replacing the current non-zero coefficient with a subsequent non-zero coefficient of the merged kernel, when a first plurality of elements associated with the currently loaded row in the vector register are multiplied with the current non-zero coefficient.

* * * * *